Figure 1:
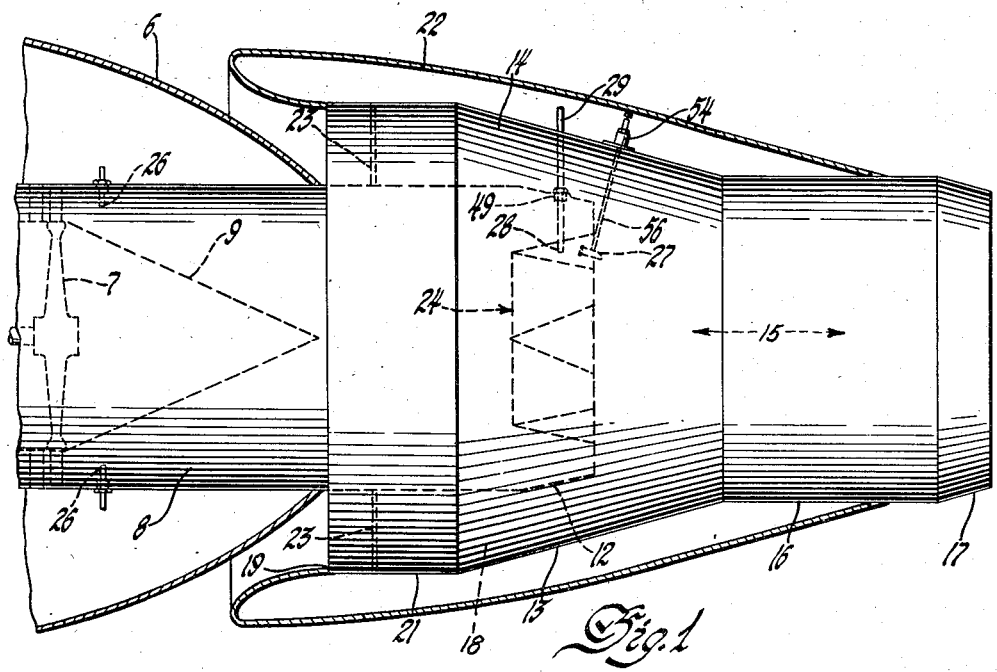

April 21, 1959   H. C. KARCHER ET AL   2,882,679
AUGMENTER TYPE AFTERBURNER FOR JET PROPELLED AIRCRAFT
Filed Dec. 22, 1950   3 Sheets-Sheet 1

Inventors
Harry C. Karcher &
Otto T. Kreusser
By Willits, Helmig & Baillio
Attorneys April 21, 1959     H. C. KARCHER ET AL     2,882,679
AUGMENTER TYPE AFTERBURNER FOR JET PROPELLED AIRCRAFT
Filed Dec. 22, 1950     3 Sheets-Sheet 3

United States Patent Office 2,882,679
Patented Apr. 21, 1959

2,882,679

AUGMENTER TYPE AFTERBURNER FOR JET PROPELLED AIRCRAFT

Harry C. Karcher and Otto T. Kreusser, Indianapolis, Ind., assignors to General Motors Corporation, Detroit, Mich., a corporation of Delaware Application December 22, 1950, Serial No. 202,158

8 Claims. (Cl. 60—35.6)

This invention relates to jet propulsion of aircraft and other bodies and, more particularly, to the augmentation of thrust of reaction engines such, for example, as turbojet aircraft engines. As is well known, such engines depend for their propulsive effect upon a jet of gas issuing at high speed from the exhaust of a gas turbine engine. More technically, the thrust of the engine is developed by increasing the velocity of the air stream passing through the engine.

In such engines, the air is compressed by a rotary compressor, is heated by combustion of fuel in one or more combustion chambers and expands, in part, through a turbine which drives the compressor. The gases exhausted from the turbine, still under very considerable pressure, are discharged through a jet nozzle at high velocity.

In engines of this type, the ratio of air to fuel is ordinarily about four times the stoichiometric ratio. It is possible, therefore, to increase the thrust of the engine by burning additional fuel in the gases exhausted from the turbine as they proceed to the jet nozzle. In this way, the temperature of the jet is increased and thereby its velocity. An apparatus for thus augmenting the thrust of the engine is commonly called an afterburner. The afterburner part of the power unit is, in effect, a ramjet unit to which air is supplied by the turbojet part of the unit.

Where afterburners are provided it has been found necessary to make provision for increasing the area of the jet nozzle when the afterburner is in operation to avoid choking in the nozzle and undue back pressure in the turbine exhaust. In practice, this requirement has led to considerable complication, and no very satisfactory arrangement of a variable jet nozzle has been found because of the high temperature, high velocity, and high pressure of the gas.

It has also been proposed in connection with jet engines to utilize the jet from the engine in an apparatus such as an injector so that the jet entrains and impels additional air, with the result that the ultimate propulsive jet is of greater mass and less velocity than the original jet. The theoretical advantage of that proposal arises from the fact that efficiency of jet propulsion is low when the speed of the propelled object is low relative to the velocity of the jet. Such injector devices may be regarded as thrust augmenters in that they tend to augment the thrust of the engine at low speeds of the aircraft. The theoretical maximum propulsive effect is derived from a gas jet when the velocity of the jet relative to the aircraft is twice the forward velocity of the aircraft. Therefore, if such augmentation is to be employed, the relative amount of air entrained should be properly proportioned to the forward speed of the body and the velocity of the impelling jet. As will be apparent, devices of the character just described do not materially affect the fuel consumption of the engine. They merely adapt it to a lower speed range of the aircraft.

Thrust augmenters of the afterburner type, on the other hand, are effective at all speeds. By increasing the velocity of the jet they tend to reduce the propulsive efficiency of the jet so that the advantage is solely in terms of greater thrust. In addition, the efficiency of an afterburner as an engine is very low, the increase in thrust over that of the gas turbine engine without afterburner being much less than the increase in consumption of fuel when the afterburner is in operation. For this reason, afterburners are conceived of as devices for intermittent operation, as for takeoff or emergency military conditions.

Another disadvantage of known afterburner arrangements is that they involve combustion of large quantities of fuel in already hot gases confined in a duct. The gas temperature may be raised from about 1200° F. to 2400° F. or more. These high temperatures are destructive of the apparatus, particularly when the gases are confined under pressure in the exhaust duct ahead of the jet propulsion nozzle.

Our invention is directed to a thrust augmenting system and apparatus for jet engines which, in some respects, combines the principles of the afterburner and the injector. It thus provides for thrust augmentation by afterburning for increased thrust under all conditions of speed from takeoff to maximum speed of the aircraft, and also provides increased thrust during normal or cruising operation through the application of the injector principle to increase the mass of the jet at the expense of its velocity. By virtue of the invention, the performance of the engine is improved and rendered more flexible.

The principle of our invention differs from known afterburners, however, in that the additional fuel is burned in a gas stream downstream from a nozzle at a point where the gas is effectively unconfined. The jet of gas issuing at high velocity from a nozzle does not immediately expand in cross-sectional area but contracts initially to the vena contracta, after which it expands slowly at first. The gas stream thus has an inherent boundary. By passing the gas stream through a nozzle to establish such a free jet, and adding energy by combustion in the jet, the thrust is augmented without the necessity for providing a confining duct for the gas stream subjected to the pressure of the gas.

The effect of burning fuel immediately behind the nozzle is to enlarge the area of the gas stream and also its velocity, enlarging or eliminating the vena contracta, and increasing the total thrust because of the higher velocity of the air stream.

Another important feature of the invention is that it makes possible the advantages of afterburning without the attendant complexities and disadvantages of variable area exhaust nozzles. A still further advantage of the invention is that it makes possible the reduction of drag on the aircraft fuselage or engine nacelle due to boundary layer phenomena. This is accomplished by inspiring air from the boundary layer into the injector.

As will be seen from the succeeding detailed description of the preferred embodiment of the invention, the structure is quite simple; and the very substantial advantages of the invention will be apparent to those skilled in the art.

The principal objects of the invention are to improve the performance of jet propulsion engines, to augment thrust by burning fuel in an unconfined gas jet downstream from a nozzle, to provide augmentation of the thrust of jet propulsion engines by the utilization of either an afterburner or an injector, to provide a thrust augmenting device operable efficiently as an afterburner or as an injector, to lessen parasitic drag on an aircraft by removing the stagnant boundary layer of air adjacent the rear end of a fuselage or nacelle, and to devise a thrust augmenting device of the character described readily applicable to existing jet engines and to existing aircraft with minor modifications thereof.

Figure 2:
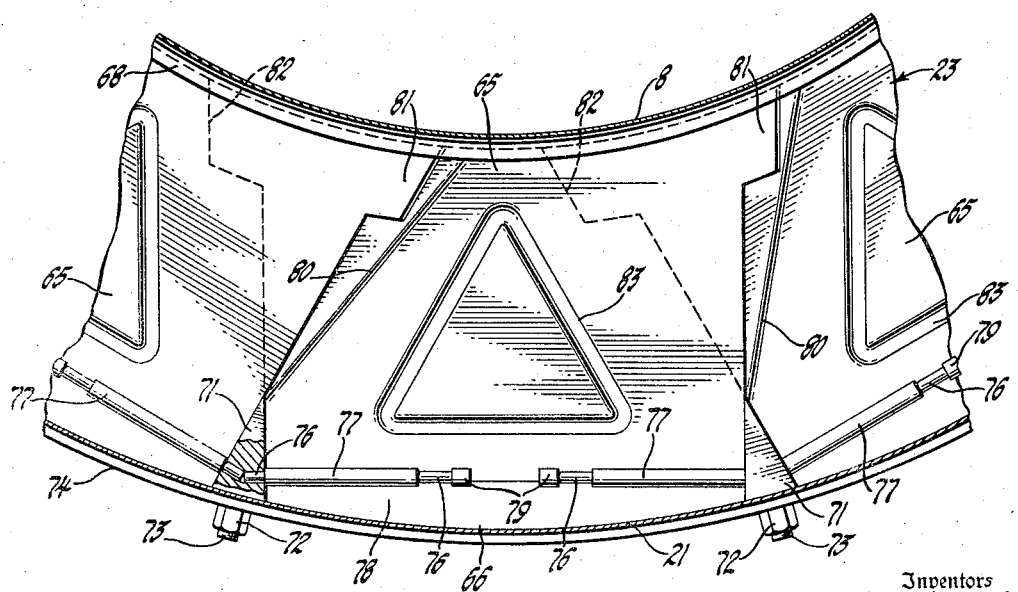
Figure 3:
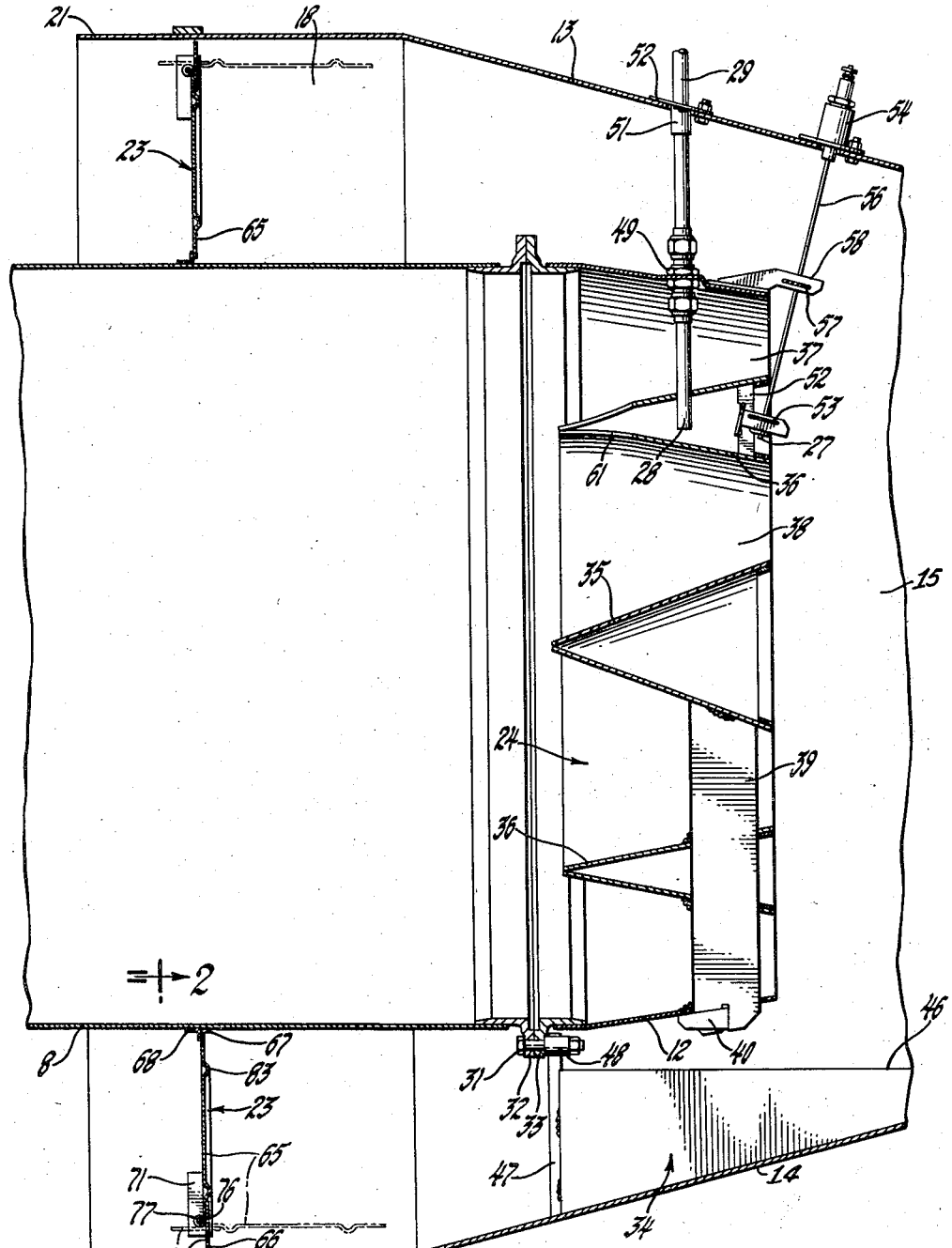
Figure 4:
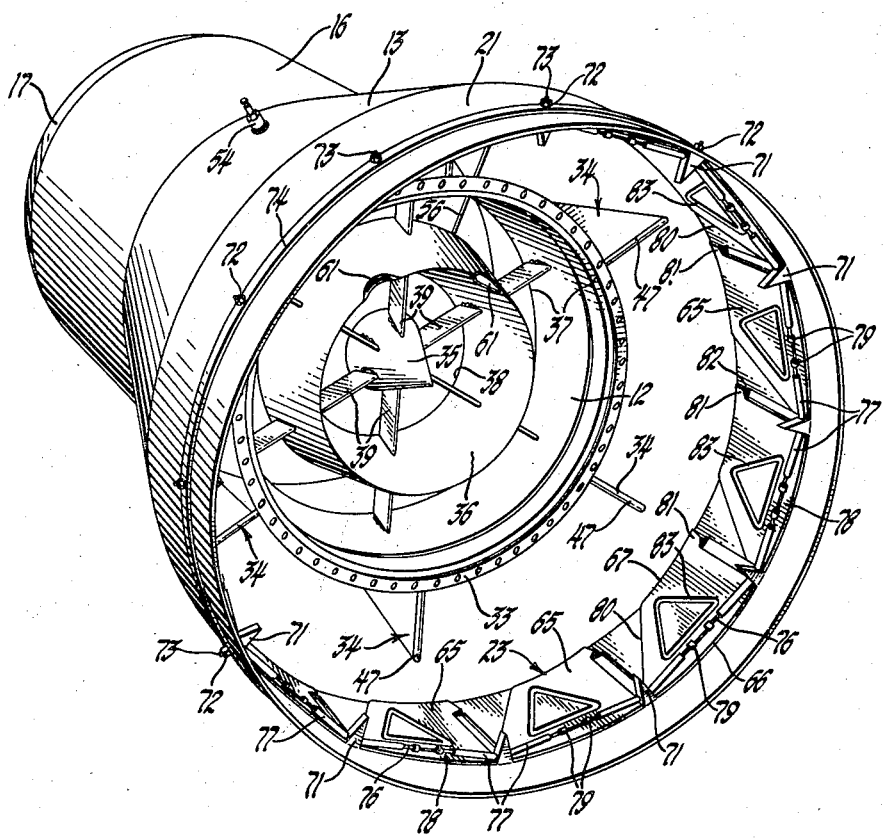
Figure 1A:
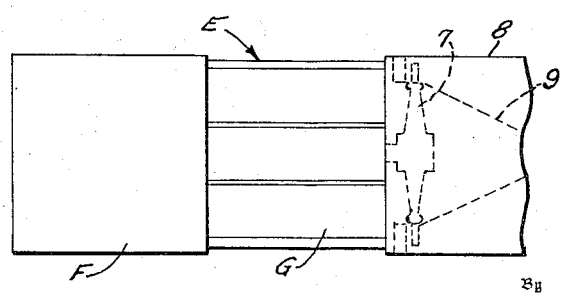

Referring to the drawings: Figure 1 is a somewhat schematic view illustrating the installation of the invention in an aircraft; Fig. 1A is a schematic drawing of a turbojet engine; Figure 2 is a detail sectional view taken on the plane indicated in Figure 3; Figure 3 is a longitudinal sectional view of the thrust augmenter mounted on the tailpipe of a jet engine; and Figure 4 is a perspective view of the thrust augmenter structure.

Referring first to Figure 1, a jet propulsion engine E, which may be of a conventional type, is mounted in a fuselage or nacelle, the outline of which is indicated at 6. The jet propulsion engine may be of any known type, and the details of the engine are immaterial to an understanding of the invention. The engine includes a turbine wheel 7, an exhaust pipe 8, commonly known as the tailpipe, and a tailcone 9. As shown in Fig. 1A, the engine also includes a compressor F driven by the turbine wheel 7 and a combustion apparatus G in which the gas discharged from the compressor is heated by the burning of fuel therein and from which the combustion products flow to the turbine wheel 7. As will be understood, the details of this structure are immaterial to the invention. As will be understood by those skilled in the art, the engine is mounted forwardly of the tailpipe and the exhaust gases of the engine are directed through the tailpipe to an exhaust nozzle from which the propulsive jet issues. The length of the tailpipe is suited to the particular installation, and may vary greatly. The tailpipe 8 terminates in a slightly converging nozzle 12 which, in a conventional jet engine with or without afterburner, constitutes the atmospheric exhaust. A conventional afterburner would be installed in the tailpipe 8, which would be elongated and enlarged somewhat in diameter relative to the tailpipe 8 illustrated. In an engine according to our invention, the nozzle 12 discharges into a converging portion 13 of a duct 14 which continues rearwardly from the nozzle 12 into a cylindrical portion 16 and may terminate in a slightly converging outlet 17 from which the gases are exhausted to atmosphere. The duct 14 defines an injector and afterburner combustion chamber 15 within the portion of the duct downstream from nozzle 12. When the engine is operated without afterburning, air is induced into the duct 14 through an annular passage 18 around the tailpipe 8 and ejected through the outlet 17 along with the combustion gases from the engine. The passage 18 originates in an annular entry 19 disposed around the after portion of the engine housing 6 so that air from the stagnant boundary layer is drawn into the passage 18 and removed from the surface of the housing 6. The entrance 19 may be joined to the conical portion 13 of the duct by a substantially cylindrical portion 21, and the major portion of the outer casing of the augmenter constituted by the sections 21, 13, and 16 may be installed within a streamlined outer shell 22 constituting a continuation of the streamlined envelope 6, apart from the slight discontinuity at the inlet 19. Mounted in the passage 18 is a ring check valve 23 composed of a number of doors or flaps, to be described more particularly, which are open in the phase of operation just described.

The high-velocity gas stream from the tail pipe 8 entering the chamber 15 acts as an injector to draw air into the intake 19 and expel it, mixed with the combustion products, through the outlet 17, which is of greater area than the nozzle 12, particularly as the clear area of nozzle 12 is reduced by a flame holder 24, to be described.

The gas stream issuing from the nozzle 17 is therefore of lower velocity but greater mass than the gas stream from nozzle 12. As a result, greater thrust for a given fuel consumption and greater propulsive efficiency are attained at cruising speeds of the aircraft.

For thrust augmentation by afterburning, fuel is introduced into the tailpipe by a number (preferably about sixteen) of spray nozzles 26, arranged in a ring adjacent the turbine outlet, two of which are shown in Figure 1. Although most of the oxygen of the air in the turbine exhaust is unconsumed, combustion does not take place in the tail pipe because the velocity of the gas is higher than the velocity of flame propagation. The atomized fuel is presumably vaporized, however, by the hot exhaust gases. Combustion takes place in the chamber 15 because controlled turbulence is created by the flame holder 24.

The flame holder may be of any suitable type, the preferred type being illustrated more fully in Figures 3 and 4. One or more fuel igniters 27, preferably of the type providing an electric arc, are installed in the lee of the flame holder. An auxiliary fuel nozzle 28 fed by a conduit 29 is preferably installed adjacent each igniter to provide a local concentration of fuel at the igniter to form a pilot flame and thus assure ignition of the fuel-combustion gas mixture when the afterburner is brought into operation.

When above-normal thrust is required, as for takeoff or military maneuvers, the gas turbine is operated at full power and fuel is supplied to the nozzles 26 and 28 from any suitable source, such as a motor-driven pump (not shown) and the igniter or igniters 27 are energized from a high-tension ignition generator (not shown) which may be of known type. The fuel is burned in the combustion gases escaping from the nozzle 12 in the chamber 15, augmenting the temperature and therefore the velocity of the jet. The cross-sectional area of the jet is increased by the added energy due to combustion, but the outlet 17 is sufficiently large to accept the enlarged jet stream without choking or developing substantial back pressure. In fact, in high speed operation of the aircraft at least, we believe that the outer shell 13, 16, 17 could be eliminated without diminishing the effectiveness of the engine. This is due to the fact that the jet is in a condition of stability due to its velocity. The outer shell is not relied upon to confine the gases under significant pressure, and the outlet 17 does not act as a nozzle under these conditions.

The outer shell will probably be beneficial in stabilizing combustion when afterburning is employed at low forward velocities of the aircraft, as at takeoff and during steep climbs. The shell is provided primarily for thrust augmentation without afterburning by induction of additional air, and is so proportioned as not to create any significant static pressure in the jet during afterburning. The afterburning preferably increases the pressure in the chamber 15 sufficiently to develop a small back pressure in the inlet 18 and thereby close the check valve 23. The outlet 17 is of sufficient size to handle properly the increased volume of gas due to afterburning, since the outlet is larger than the nozzle 12. Moreover, the increase in volume is compensated for by the cessation of flow through the inlet 18. Since the air inlet is in a region of stagnant boundary layer air, there is no ram effect in the inlet tending to open the valve 23.

It is believed that the principles of the invention will be clear to those skilled in the art from the foregoing, but it is believed desirable to explain in more detail the preferred structure by which the invention is put into practice.

Referring to Figures 2, 3, and 4, which illustrate in greater detail the preferred structure of a thrust augmenter unit in accordance with the invention, the tailpipe 8 and the nozzle 12, which may be of any suitable heat-resisting metal, are assembled together by bolts 31 passing through flanges 32 and 33 welded to the tailpipe and nozzle. The outer casing of the thrust augmenter comprising the portions 21, 13, 16, and 17 may be a unitary structure or may be assembled in sections, if desired, and is preferably of circular cross-section. This outer casing is supported on the tailpipe by a plurality of struts 34.

The flame holder 24 comprises a cone 35 and an annulus 36 located concentric with the axis with their apexes upstream. The nozzle 12 converging downstream and the flame holder elements diverging downstream define two converging concentric passages 37 and 38 for discharge of combustion gas from the engine.

The flame holder is supported in position by a plurality of radial struts 39 passing through the element 36 and welded to the flame holder elements 35 and 36. These struts pass through openings in the nozzle 12 and are slotted at their outer ends. U-shaped guides 40 welded to the nozzle 12 and passing through the slotted ends of the struts 39 locate the struts, but allow for radial expansion.

The struts 34 (Figure 3) preferably comprise an inwardly directed fin or rib 46 welded to the conical portion 13 of the outer casing and serving as a stiffening member and a post 47 welded to the front end of the rib 46. The radially inner end of each post 47 is slidably mounted in a block 48 mounted by two of the bolts 31, thus securing the outer casing to the tailpipe with provision for radial expansion.

The fuel nozzles 28 for the pilot flame, preferably two in number, are supported in the casing 12 by conventional tube fittings indicated at 49 which couple each nozzle to its supply pipe 29, this pipe passing through a sleeve 51 welded to a plate 52 bolted to the portion 13 of the outer casing. The ignition electrodes 27, which are preferably two in number for more certain ignition, are supported in sheet metal brackets 52 in the outer flame holder 36 by an insulator 53. The igniters are supplied from terminals 54, which may be of conventional structure, bolted to the outer casing member 13. The high tension lead 56 from the terminal to the igniter may be supported by an insulator 57 mounted on a sheet metal bracket 58 welded to the nozzle 12. The nozzles 26 (Fig. 1) and 28 may be of known type, comprising a section of tubing with the end closed and with small orifices in the side wall of the tube so that when fuel is supplied under high pressure a spray is discharged from the tube. The discharge may be upstream, downstream, or laterally, as preferred.

The leading edge portion of the outer flame holder 36 is cut away ahead of the nozzles 28, as indicated at 61, to admit a relatively small quantity of air for combustion of the fuel injected through nozzles 28. The air entering through the opening 61 is diffused in the flame holder so that its velocity is reduced to a point at which combustion is easily sustained.

Proceeding to the preferred structure of the check valve assembly 23, the moving portion of the valve consists of a plurality of pivoted plates 65 shown in the closed position in Figures 2 and 3 and in open position in Figure 4. The plates 65 overlap so as to operate together in opening and closing. Each plate 65 is bounded by arcuate outer and inner edges 66 and 67 respectively so that, in the closed position, the edges of the plates closely approach the cylindrical outer casing 21 and tailpipe 8. An angle iron ring 68 welded to the tailpipe provides a stop for the flaps 65 in their closed position. The number of plates 65 may vary, but twelve is considered to be a desirable number. The plates 65 are supported by twelve wedge-shaped pivot blocks 71 which are fixed to the casing portion 21 by nuts 72 engaging studs 73 extending into the blocks 71. Preferably, a stiffening ring 74 is disposed around the casing 21 in the plane of the blocks 71. The blocks 71 are drilled for hinge pins 76 which serve as pivots for the plates 65. Preferably, the plates are formed in two parts, one part extending from the inner margin to the hinge pins and being rolled to provide a tubular socket 77 for each hinge pin. The outer portion 78 of the plate, which defines the arcuate edge 66, may be welded to the main body of the plate 65. In assembly, the plates are put in position between the blocks 71, and the hinge pins are pushed into the sockets in the blocks. The pins are secured in any suitable manner, preferably by bending over tabs 79 extending from the edge of the plate 65. The block 71 closes the gap between the outer portions of the edges of the adjacent plates 65 when the valve is closed.

Each plate 65 overlies the plate at one side thereof and underlies the plate at the other side. One corner of the plate is slightly offset along the line 80 so that the plates will lie flat in the closed position. The inner marginal portion of each plate is formed with circumferentially extending tabs 81 and 82 which overlie each other when the valve is open, as in Figure 4. The plates 65 may be deformed or ridged as indicated at 83 for stiffening.

The operation of the valve will be obvious. When the pressure on the forward face of the valve is greater than that in the passage 18, the valve will open, the leaves 65 operating simultaneously because of the overlap. Any tendency to reverse flow of gas through the passage 18 will close the valve and seat it against the ring 68. As will be apparent, the valve offers very slight resistance to flow toward the chamber 14 and is substantially airtight when closed, so that no significant leakage through the valve can occur.

It will be apparent that the preferred augmenter structure illustrated in Figures 2 to 4 is particularly suited for the performance of the functions set out in the discussion of Figure 1. It will be clear, however, to those skilled in the art that many modifications of the structure may be made within the scope of the invention. The operation of the specific structure will be clear from the previous discussion of the operation of the thrust augmenter, which need not be repeated.

The physical dimensions and proportions of the apparatus may be determined for any given installation according to known engineering principles from the characteristics of the jet propulsion unit which discharges through the tailpipe 8 and the desired overall characteristics of the entire propulsion unit including the thrust augmenter.

The description herein of the preferred embodiment of the invention is not to be construed as restricting or limiting the invention, which is subject to various modifications within the scope thereof.

We claim:

1. A jet-propelled aircraft comprising, in combination, an aircraft body, means therein for generating a high-velocity gas stream containing a substantial proportion of uncombined oxygen, a nozzle for said stream, means defining an injector chamber around and extending downstream from the nozzle with an outlet from the chamber aligned with the nozzle, a duct defining an inlet to said chamber, a one-way valve in said duct open to flow to the chamber, and means for burning fuel in said chamber, the entrance to said duct being located so as to receive boundary layer air adjacent said body.

2. The combination of an aircraft and a jet propulsion device therefor comprising, in combination, a thermal jet engine, an injector connected therewith to receive the exhaust stream from the engine the exhaust of which contains a substantial proportion of uncombined oxygen, entrain additional air therewith, and expel the resulting gas stream as a propulsive jet, an air intake conduit for the injector with the intake thereof located to inspire boundary layer air adjacent said aircraft, means for burning fuel in the exhaust stream of the engine, and means responsive to a phenomenon indicative of such burning of fuel to close the air intake conduit.

3. A jet propulsion device comprising, in combination, a thermal jet engine the exhaust of which contains a substantial proportion of uncombined oxygen, an injector connected therewith to receive the exhaust stream from the engine, entrain additional air therewith, and expel the resulting gas stream as a propulsive jet, an air intake conduit for the injector, means for burning fuel in the exhaust stream of the engine, and means responsive to a phenomenon indicative of such burning of fuel to close the air intake conduit.

4. A reactive propulsion engine comprising, in combination, means for generating a stream of gas under pressure containing a substantial proportion of uncombined oxygen, a tailpipe for conveying the stream, a nozzle at the outlet of the tailpipe, a conduit extending over the outlet end of the tailpipe and continuing beyond the tailpipe to a jet propulsion outlet and defining with the tailpipe an annular inlet, valve means in the inlet open to flow into the inlet and closing against reverse flow, and means for burning fuel in the conduit, the jet propulsion outlet being sufficiently small that the burning of fuel in the conduit creates a pressure differential in the conduit over that in the inlet causing the valve means to close.

5. A reactive propulsion engine comprising, in combination, a jet propulsion unit, an injector with an air inlet, an inlet connected to the exhaust from the said unit, and a propulsive jet outlet, the said injector being adapted to utilize the energy of the said exhaust to draw air into the said inlet, entrain it with the turbine exhaust gases, and expel the resulting gas stream through the propulsive jet outlet, means for burning fuel in the injector to increase the temperature of the gases passing therethrough, an annular air conduit connected to the air inlet, and a check valve in the air conduit adapted to close against reverse flow through the said conduit, the check valve comprising a plurality of interleaved flaps pivoted on axes generally tangential to the inlet and formed with arcuate inner and outer margins, and a stop on a wall of the conduit for the flaps.

6. A thrust augmenter for a jet propulsion engine including a tailpipe, the said augmenter comprising, in combination, means defining an injector chamber receiving the outlet of said tailpipe and terminating in a fixed-area jet propulsion outlet aligned with the tailpipe, an annular air intake duct for the chamber disposed alongside the tailpipe, check valve means comprising a plurality of flaps coupled for simultaneous operation in the intake duct and opening to flow into the chamber, and means for burning fuel in the chamber to increase the energy of the gas stream in the chamber and thereby close the said valve.

7. A reactive propulsion engine comprising, in combination, a jet propulsion unit, an injector with an air inlet, an inlet connected to the exhaust from the said unit, and a propulsive jet outlet, the said injector being adapted to utilize the energy of the said exhaust to draw air into the said inlet, entrain it with the turbine exhaust gases, and expel the resulting gas stream through the propulsive jet outlet, means for burning fuel in the injector to increase the temperature of the gases passing therethrough, an air intake conduit connected to the air inlet, and a check valve in the air intake conduit adapted to close against reverse flow through the said conduit.

8. A jet-propelled aircraft comprising, in combination, an aircraft body, means therein for generating a high-velocity gas stream containing a substantial proportion of uncombined oxygen, a nozzle for said stream, means defining an injector chamber around and extending downstream from the nozzle with an outlet from the chamber aligned with the nozzle, a duct defining an inlet to said chamber, a one-way valve in said duct open to flow to the chamber, and means for burning fuel in said chamber, the entrance to said duct being located so as to receive boundary layer air adjacent said body, the outlet being sufficiently small that the burning of fuel in the chamber creates a pressure differential in the chamber over that in the duct causing the one-way valve to close.

References Cited in the file of this patent

UNITED STATES PATENTS

| | | |
|---|---|---|
| 2,390,161 | Mercier | Dec. 4, 1945 |
| 2,482,505 | Pierce | Sept. 20, 1949 |
| 2,509,890 | Stalker | May 30, 1950 |
| 2,514,513 | Price | July 11, 1950 |
| 2,527,732 | Imbert | Oct. 31, 1950 |
| 2,566,373 | Redding | Sept. 4, 1951 |
| 2,653,445 | Halford et al. | Sept. 29, 1953 |
| 2,688,843 | Pitt | Sept. 14, 1954 |

OTHER REFERENCES

"Aviation" Magazine, March 1946, pages 74 and 75.
"Scientific American," November 1947, page 220.

UNITED STATES PATENT OFFICE
CERTIFICATE OF CORRECTION

Patent No. 2,882,679                                                 April 21, 1959

Harry C. Karcher et al.

It is hereby certified that error appears in the printed specification of the above numbered patent requiring correction and that the said Letters Patent should read as corrected below.

Column 6, lines 59 to 61, inclusive, claim 2, should read -- engine the exhaust of which contains a substantial proportion of uncombined oxygen, an injector connected therewith to receive the exhaust stream from the engine, en- --.

Signed and sealed this 18th day of August 1959.

(SEAL)
Attest:

KARL H. AXLINE
Attesting Officer

ROBERT C. WATSON
Commissioner of Patents